US008954471B2

(12) United States Patent
Gueldemeister

(10) Patent No.: US 8,954,471 B2
(45) Date of Patent: Feb. 10, 2015

(54) METHOD AND SYSTEM FOR PROVIDING PROCESS-BASED ACCESS CONTROL FOR A COLLABORATION SERVICE IN ENTERPRISE BUSINESS SOFTWARE

(75) Inventor: Ralf Gueldemeister, Los Altos, CA (US)

(73) Assignee: SAP SE, Walldorf (DE)

( * ) Notice: Subject to any disclaimer, the term of this patent is extended or adjusted under 35 U.S.C. 154(b) by 456 days.

(21) Appl. No.: 12/612,839

(22) Filed: Nov. 5, 2009

(65) Prior Publication Data

US 2011/0107231 A1      May 5, 2011

(51) Int. Cl.
  *G06F 17/30* (2006.01)
  *G06Q 10/10* (2012.01)
  *G06F 7/00* (2006.01)

(52) U.S. Cl.
  CPC ................................... *G06Q 10/10* (2013.01)
  USPC .......................................... 707/783; 707/791

(58) Field of Classification Search
  CPC ............... G06F 2221/2141; G06F 2221/2145; G06F 2221/2149; G06F 17/30; G06F 17/2288; G06F 17/30165; G06F 21/00; G06F 21/31; G06F 21/604; G06F 21/6245; G06F 9/468; G06Q 10/06; G06Q 10/063; G06Q 10/103; G06Q 10/0631; G06Q 10/06311; G06Q 10/06315; G06Q 10/06316
  See application file for complete search history.

(56) References Cited

U.S. PATENT DOCUMENTS

| | | | |
|---|---|---|---|
| 6,625,603 B1 * | 9/2003 | Garg et al. | 707/758 |
| 7,174,348 B1 | 2/2007 | Sadhu et al. | |
| 7,299,257 B2 | 11/2007 | Boyer et al. | |
| 7,836,130 B2 | 11/2010 | Korat | |
| 2002/0147777 A1 | 10/2002 | Hackbarth et al. | |
| 2003/0033285 A1 * | 2/2003 | Jalali et al. | 707/1 |
| 2004/0117371 A1 * | 6/2004 | Bhide et al. | 707/9 |
| 2006/0080640 A1 | 4/2006 | Cheng et al. | |
| 2006/0101071 A1 * | 5/2006 | Henderson | 707/104.1 |
| 2007/0124374 A1 * | 5/2007 | Arun et al. | 709/204 |
| 2007/0192256 A1 | 8/2007 | Notani et al. | |
| 2007/0294348 A1 | 12/2007 | Cohen et al. | |
| 2008/0270466 A1 | 10/2008 | Claussen et al. | |
| 2008/0281915 A1 | 11/2008 | Elad et al. | |

OTHER PUBLICATIONS

Dictionary.com, Collaboration, Aug. 21, 2007.*

* cited by examiner

*Primary Examiner* — Usmaan Saeed
*Assistant Examiner* — Yu Zhao
(74) *Attorney, Agent, or Firm* — Kenyon & Kenyon LLP

(57) ABSTRACT

The present invention relates to access control objects directly associated with collaboration process nodes, which are themselves associated with a collaborative software object. The direct association of the access control objects allows for a fine granularity of per-party access control at every step of a collaborative process. Systems and methods for constructing access lists from the access control objects are described, as well as restricted GUI rendering according to access indicators associated with an access control object.

25 Claims, 9 Drawing Sheets

Access Control Object 300

| Root Node 305 | Object Type Code 310 | Object Node Type Code 312 | Key 314 | Host Key 316 | Prefix 318 | Current Node Scope Indicator 320 | Parent Node Scope Indicator 322 |
|---|---|---|---|---|---|---|---|
| Ancestor Nodes Scope Indicator 324 | Descendant Nodes Scope Indicator 326 | Sibling Nodes Scope Indicator 328 | References Scope Indicator 330 | Root Scope Indicator 332 | Additional Data 335 | | |
| Partner Node 340 | Object Node Type Code 342 | Key 344 | Parent Key 346 | Root Key 348 | Partner ID 350 | Access Mode 352 | Access Admin. Mode 354 |
| | | | | | | Additional Data 355 | |
| Reference 360 | Object Node Type Code 362 | Key 364 | Parent Key 366 | Root Key 368 | Target Key 370 | | |

FIG. 3

| Node | Key | Parent Key/ Hosting Key | Object Type Code | Object Node Type Code |
|---|---|---|---|---|
| Root | K01 | | O1 | N1 |
| A | K02 | K01 | O1 | N2 |
| B | K03 | K01 | O1 | N2 |
| C | K04 | K02 | O1 | N3 |
| D | K05 | K02 | O1 | N3 |
| E | K06 | K03 | O1 | N4 |
| Process Root | K07 | K05 | O2 | N5 |
| Access Control Object Root | K08 | K07 | O3 | N6 |
| Party 1 | K09 | K08 | O3 | N7 |
| Reference to D | K10 | K08 | O3 | N8 |

FIG. 4

Partner ID | Table
--- | ---
Key | Access Mode | Parent Key

| Partner ID | Key | Access Mode | Parent Key |
|---|---|---|---|
| 1 | K05 | 02 | |
| | K06 | 02 | K05 |

FIG. 8

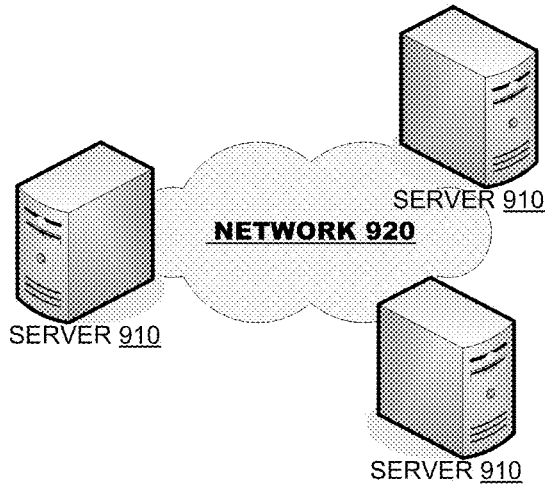
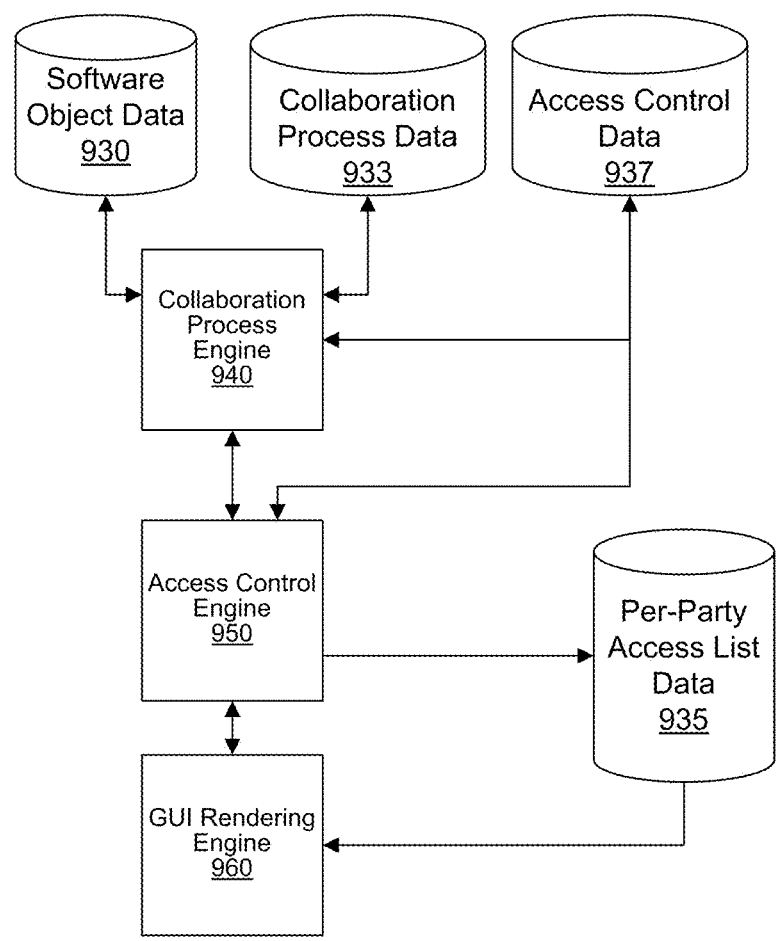
FIG. 9

METHOD AND SYSTEM FOR PROVIDING PROCESS-BASED ACCESS CONTROL FOR A COLLABORATION SERVICE IN ENTERPRISE BUSINESS SOFTWARE

CROSS-REFERENCE TO RELATED APPLICATION

This application is related to U.S. patent application Ser. No. 11/947,801, filed on Nov. 30, 2007, the entire contents of which are expressly incorporated herein by reference.

BACKGROUND

Collaborative software is software designed to help people involved in a common task to achieve their goals. The software may provide tools to facilitate inter-party communication, task partitioning, especially task specialization, and overall project organization. Collaborative management tools include project management systems that are used to schedule, track, and chart the steps in a project as it is being completed. Collaborative software allows for several distinct entities to specialize in particular areas, yet come together for a larger project involving those areas. Typically there will be a project owner and several sub-contractors. Current designs may allow different degrees of restricted access, but those permissions are typically entity based. Since the access requirements of different entities of the collaboration will fluctuate depending on the stage of the project and also on the various decisions made during the collaborative process, there exists a need for a process-based access control mechanism, which may be directly related to the collaboration process.

BRIEF DESCRIPTION OF THE DRAWINGS

FIG. 3 is an illustration of a data structure object according to an example embodiment of the present invention.

FIG. 4 is an illustration of a list form of data according to an example embodiment of the present invention.

FIG. 8 is an illustration of a list form of data according to an example embodiment of the present invention.

FIG. 9 is an illustration of an example system according to another example embodiment of the present invention.

DETAILED DESCRIPTION

The commonly assigned incorporated reference describes a collaborative process that may be facilitated by a collaboration data structures being mapped to and associated with a hierarchical business object (e.g., a representation/description of the project being collaborated on). The collaborative process may require multiple parties to be involved. The level of involvement of each party may fluctuate during each point in the collaborative process, and may also be different based on the party or the task assigned to the party. Since it is common for a collaborative project to include at least some outside parties (e.g., sub-contractors), a collaborative process data structure may require an access control mechanism. This mechanism may restrict each party to the appropriate information for that party. Some access control mechanisms already exist, but are usually entity based, manually configured, and generally applicable based solely on the assigned entity. Example embodiments of the present invention may create an access control object to be directly associated with a node of the underlying business or collaborative data structure. In this way, the pre-existing organization and structure of the business object, and the pre-existing organization of the collaboration object may be leveraged to incorporate an access control mechanism that is uniquely specific to every aspect of the process, without requiring manual configuration for each party. The example systems and example methods described below illustrate an access control object directly associated to portions of the collaborative process object, and how this data may be utilized to construct access restricted renderings of a graphical user interface for a restricted party.

Figure 1:
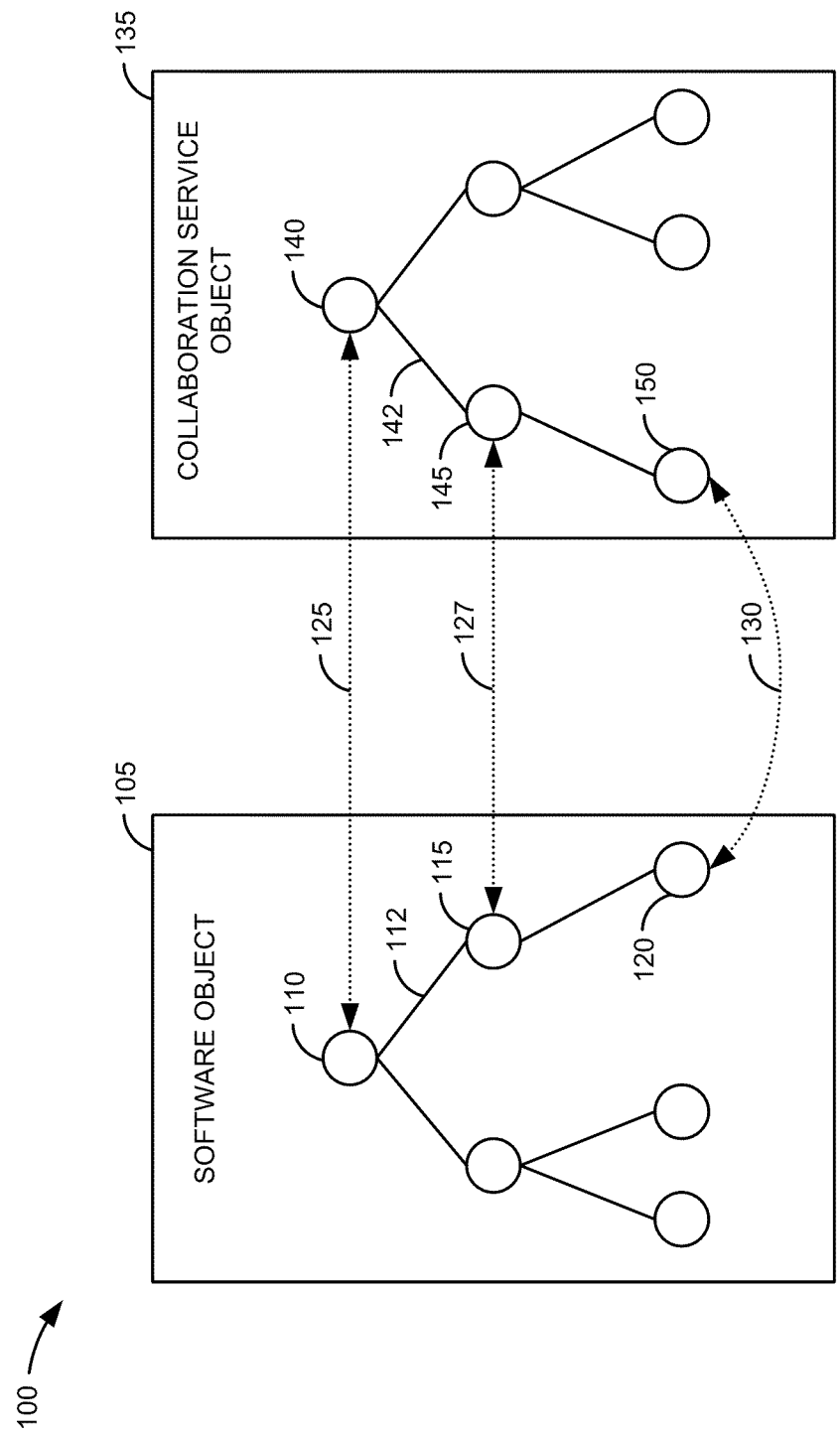
FIG. 1 is an illustration of a software object mapped to a collaboration object.

FIG. 1 is a block diagram illustrating a collaboration service data structure mapped to a software object (e.g., a business object), according to the systems and methods of the incorporated reference. The business object may be a linked hierarchy of nodes that model a real life business process. The collaboration object, mapped to the business object, may provide data and methods that may model a real life collaboration. The collaboration data structures illustrated in FIG. 1 may serve as a foundation for the implementation of example embodiments of the present invention. Generally, a collaboration may include a structured, recursive process where two or more entities work together toward a common goal by sharing knowledge, and providing specializations to a common project. System 100 illustrates a collaboration service object 135 that offers a set of software based designed to help collaboration processes between software objects which contain information provided by parties involved in the collaboration.

Software object 105 may include a business object to represent a business instrument. For example, the object may include data and functions to represent a purchase order, a work order, or a sales order. Software object 105 may be organized as a collection of software object nodes such as first software object node 110, second software object node 115, and third software object node 120 linked to each other hierarchically. Collaboration service object 135 may also be organized in a way similar to software object 105. Collaboration service object 135 may include collaboration service nodes such as first collaboration service node 140, second collaboration service node 145, and third collaboration service node 150, wherein each collaboration service node corresponds to a software object node in software object 105. First collaboration service node 140 may be a collaboration service node created for first software object node 110. Second collaboration service node 145 is a collaboration service node created for second software object node 115. First collaboration service node 140 and second collaboration service node 145 are hierarchically linked to each other via link 142 in a way similar to that of first software object node 110 and second software object node 115 which are connected via link 112 in software object 105. In an embodiment, first collaboration service node 140 and second collaboration service node 145 are linked hierarchically to allow execution of hierarchy based functions. Hierarchical function includes a function that is capable of influencing both a parent node and a related child node of the parent node when the function is executed on the parent node.

Collaboration processes may include any number of tasks, and therefore collaboration objects may include any number of corresponding functions and structures. Examples may include negotiation, requests for execution, requests for clarification, a tendering process, an approval process, open discussions, exception handling, or the integration of external collaboration. An example of a negotiation may include two or more parties negotiating a business case, proposing new business as well as collaboration content which can be accepted, rejected or revised by the other parties. This complex scenario covers a wide range of use cases and may involve a sophisticated status and revision management. This process may be modeled by a series of hierarchical objects. For example, a communication object may provide email, instant message, bulletin board, etc. functions, with exchanged messages as stored data. Objects associated with the negotiation process may maintain a status of the negotiation, and may provide bidding functions in various forms. As parties can be added and removed from the negotiation process at any time, as well as at any place in the hierarchy tree that is affected by the negotiation, it may have advanced requirements for the access control. For example, a broader set of parties may be included during negotiation, but be restricted from seeing data (e.g., bids) from other parties. Then, once the negotiation concludes, future data may be restricted to the winning bidder, with all others restricted out, e.g., unable to view that data from their specific user interface.

An example request for execution may pertain to a digital business document (e.g., as the software object 105), where a certain element is requested for execution. For example, the status may be flagged as being in execution and the business partner responsible for execution may be notified via one of the associated messaging functions. The new stage of the process "execution" may create a new object node in the software object, with a new collaboration node in the collaboration object. Further, according to an example embodiment of the present invention, a new access control object may be associated with the new collaboration node. The executing business partner might receive additional access rights to the digital document for the time of the execution, via the new access control object associated with the execution node. Thus, by attaching an access control object to this new node, access rights may be granted specific to the execution of this request. A request for clarification may operate in a similar manner.

An example of the tendering process may include the owner of the business object initiating the tendering process, which may create a new data object node to represent the tendering functions and data, such as which parties should receive the object. A certain object or object node can be tendered as peer-to-peer to a specific party or broadcasted to a set of parties through associated messaging functions. An offer may be accepted automatically based on certain criteria stored within the object or manually, i.e. using an approval process. This requires a relatively straight forward access control object (e.g., to those the tender is being made), but is still specific to the collaboration process node created by the initiated tendering process. The approval process may be used in scenarios where certain parts of the business object (e.g., a business document) require approval by a specific party or member of a party. The status of affected nodes may be set to 'requires approval' and the node might only be released once approval has been given.

Collaboration objects may also be used to model more unstructured collaboration. The open discussion process may attach a discussion forum to a business object node and may enable free form comments and replies. Further, exception handling may include a special requirement for business processes that involve collaboration processes with internal as well as external parties. Exceptions can occur when a business object or object node reaches an inconsistent state or when other object specific conditions are met. This class of processes encapsulates the exception handling and can feature notifications, automated actions and the triggering of other collaboration processes. Any number of other software object nodes and associated collaboration nodes are possible in the example data structures, such as FIG. 1.

Figure 2:
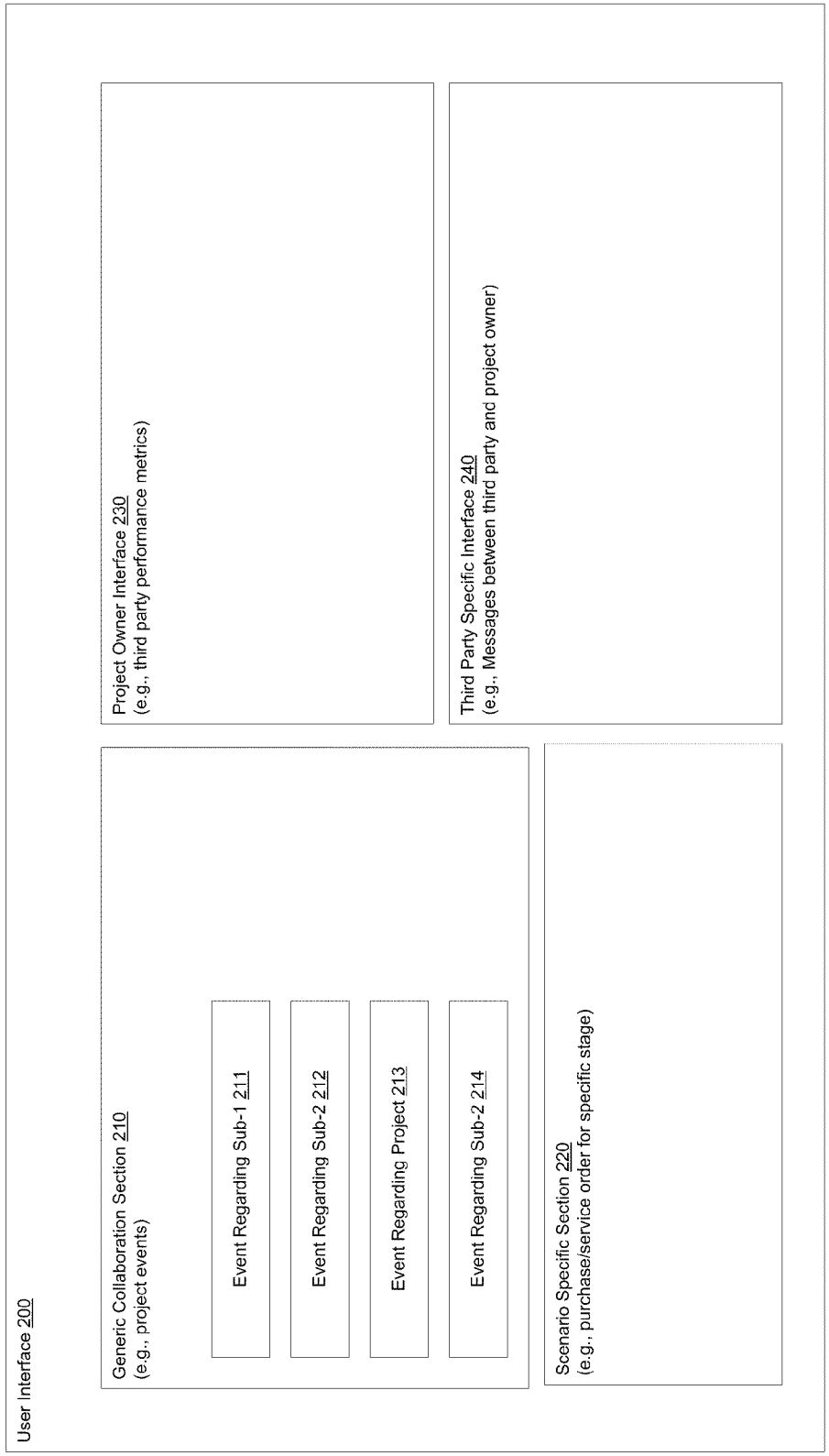
FIG. 2 is an illustration of a user interface outline.

In addition to the internal data structures described in FIG. 1, graphical user interfaces ("GUI" or just "UI") may be constructed/rendered directly from those linked hierarchies, giving the collaborating users access to the collaboration data. The layout and format of these UIs may be embedded directly in the linked hierarchies, or may be contained in associated data structures of their own. The UIs may provide the actual user access to the underlying data, and thus, example embodiments of the present invention may control access for a particular user, by controlling/regulating the UI presentation. FIG. 2 illustrates a sectioned GUI 200. The data within each section of the GUI may be populated by one or more nodes from the software object 105 and collaboration object 135. There may be sections containing overall project data, such as 210. Here, there may be messages that may pertain to a first subcontracting party (e.g., 211), a second subcontracting party (e.g., 212 and 214), and the overall project (e.g., 213). These messages may need to be limited to certain parties. For example, it may be the case that contractor 1 was initially hired, but terminated in favor of contractor 2. Contractor 1 may still maintain some access to the system for administrative purposes, but access control would be required so that the project owner could see all project data (211, 212, 213, and 214), while the second contractor is precluded from seeing data regarding the first contractor (211), and the first contractor is no longer able to view any project event messages (e.g., none of 211, 212, 213, or 214, etc.)

It may be appreciated that other sections of the GUI could act in similar fashion. For example, section 220 (e.g., a purchase order for a new service) may be opened to a series of bidding parties initially, and subsequently closed to all of them except the winning bidder. This scenario illustrates the importance of a process based access control, instead of mere entity based access control. There may be sections, e.g., 230, that are only accessible by one level of the collaboration parties, e.g., the project owner. There may be sections, e.g., 240, specific to one lower level party, that is accessible by the project owner and that one party. Additionally, any number of other sections are possible. For example, one section may be based on a specific project phase, where multiple project contractors have access, and/or access adjusts as the phase progresses.

Example embodiments of the present invention may introduce the direct use of the collaboration objects and nodes (e.g., the collaboration process of FIG. 1) for access control. Since the collaboration objects and nodes may encapsulate all collaborative activity, they are an ideal means for realizing distinct collaboration stages and restricting access to business and collaboration content. The collaboration data structures may carry all knowledge about the collaboration context, especially the involved participant and access control information. In this way, access control may be conceptualized as a generic component incorporated into collaboration processes, which are attached to the business content. Whenever access control is necessary or whenever it is necessary to change access control, the underlying collaboration processes may be exposed. This enables very fine granular access control models, as participants and access control are defined on the immediate level of collaboration. The access control may therefore span both business and collaboration content, as all business object nodes can be annotated with collaboration processes to restrict access and visibility for participants.

An example embodiment of an access control data structure, according to an example embodiment of the present invention, is illustrated in FIG. 3. The central access control object may consist of three main nodes, a root node 305, partner nodes 340, and reference nodes 360. The illustrated data structure may be described with reference to commonly accepted principles of object oriented programming. However, the data and functions comprising example embodiments of the present invention may be coded in any language or computer system hardware, and the object embodiment is provided for illustrative purposes. The rights derivation strategy may be defined with a set of scope indicator attributes (e.g., 320, 322, 324, 326, 328, 330, 332, etc.) as data attributes to the object node. When a scope indicator is set (e.g., by storing a pre-defined access level code in the attribute), the access right may be derived for the target scope element(s) (e.g., current node, parent node, sibling nodes, etc.). If is not set, the access rights may not be applied, or may default to some value.

Example scope indicator attributes are illustrated in FIG. 3, and any number of additional defined node sets are also possible. There may be a current node scope indicator 320, i.e. the software object node hosting the particular collaboration node that has the associated access control object ("hosting node"). There may be a parent node scope indicator 322, for the immediate parent of the hosting node. There may be an ancestor node scope indicator 324, which may include all or a subset of all ancestor nodes to the hosting node. There may be a descendant nodes scope indicator 326, which may include some or all of the nodes for which the hosting node is a parent or ancestor. There may be a sibling node scope indicator 328, which may include all nodes with the same parent node as the hosting node. There may be a root node scope indicator 332, which would include the root node of the node structure the hosting node belongs to. There may be a reference scope indicator 330 to define the access scope of any node that is linked from the access control object outside the main link hierarchy. Any other relevant data may also be included in the root node 305 portion of the access control object 300 data structure. For example, additional data 335 may include the creation party, the creation user, party that was last changed, or the user who made the last change.

The partner node 340 may represent a party that has been granted access. Multiple parties can be represented by multiple instances of the partner node 340. The party may be identified by storing a unique Partner ID 350 data attribute. The partner node 340 also may contain the access mode 352 attribute which may define the access level to the set of nodes, as described by the derivation strategy scope indicators (e.g., 320 to 332). In contrast to the derivation strategy, the access mode may be set per party. Example values may include "01—read only," "02—read and update," "03—create, read and update," and "04—create, read, update and delete." Additionally, there may be an access admin. mode 354, which may control whether the granted party is able to change the access control object 300. Possible values for this attribute may include "00—no changes allowed," "10—can grant read access to other parties," "11—can grant lower level of access to other parties," "12—can grant same level of access to other parties," and "99—can grant and revoke any access." The additional data 355 of partner node 340 may include the ID of the granting party, ID of the granting user, the time/date rights were granted, and any validity period for the partner rights.

Generally, one instance of the root node will exist for a given access control object with one or more partner nodes. This example embodiment affords process specific scope indicators for the software object nodes, with partner specific access control (e.g., shared node scope and per-party access rights). Alternative embodiments may have several instantiations of the root node, with several sets of scope indicators. Alternative embodiments may include several access control objects associated with a process node, each with a different root node (e.g., scope indicators) and a different set of partner nodes. These latter two embodiments may add some complexity, but provide a finer granularity of access control. However, in many embodiments of the incorporated reference, access control for a specific process to the associated node sets may remain constant for all users, with only access rights differing per partner.

It may be appreciated that in certain example embodiments, a given node of the software object is affected by multiple access objects. For example, node A of FIG. 5 may have an associated access control object (via an associated collaboration node) with a current node scope indicator and a partner node for party 1. Further, node C of FIG. 5 (a child of node A) may have an associated access control object (via an associated collaboration node) with a parent node scope indicator and a partner node for party 1. Both of these access control objects may affect the scope of access to node A for party 1. In an example embodiment rules may be established for dealing with conflicts. For example, a sum of access may be given, such that if one access control object provides read access, and one access control object provides write access, the party may be given read-write access. More or less restrictive rules for dealing with conflicts are also possible (e.g., FIG. 7, step 750 illustrates a more restrictive embodiment).

Figure 5:
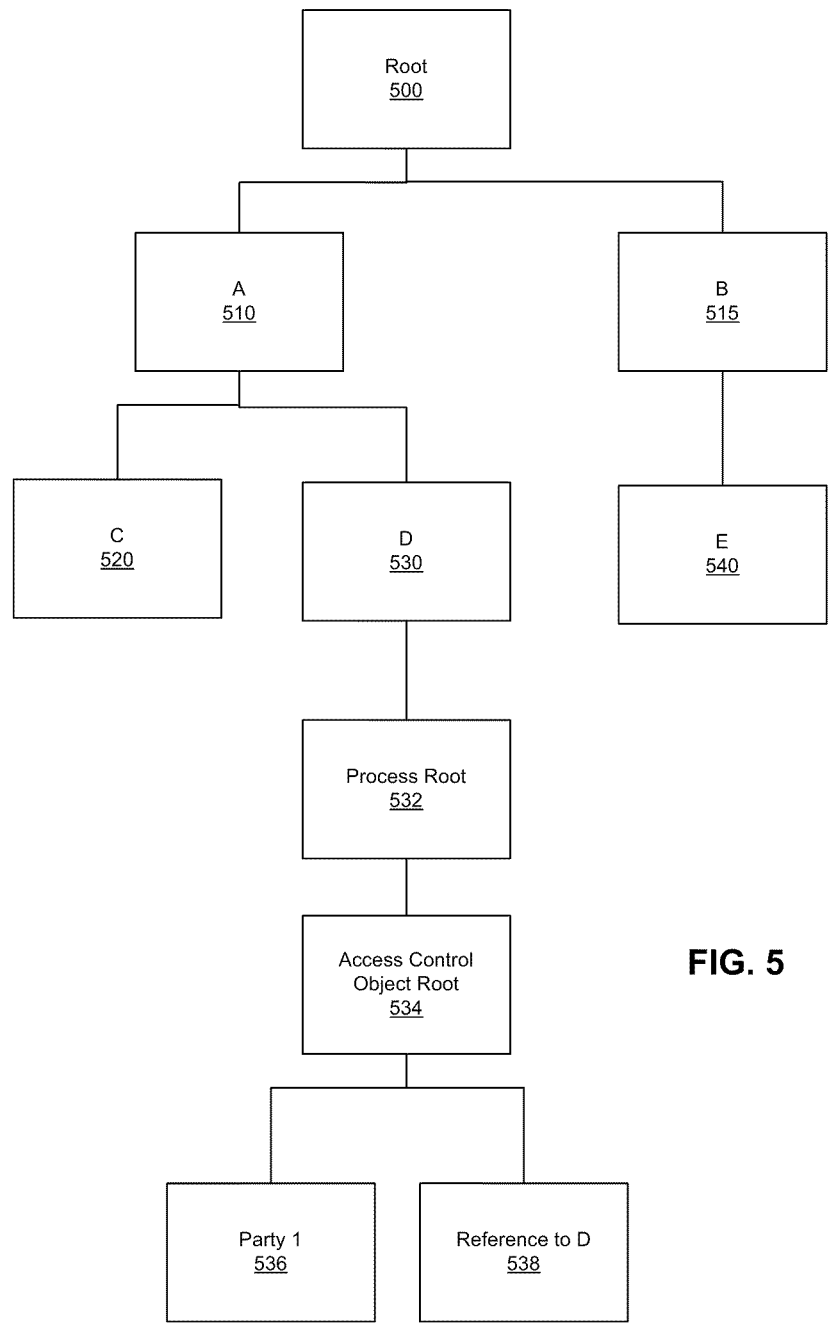
FIG. 5 is an illustration of a linked hierarchy of data according to an example embodiment of the present invention.

Example embodiments of the present invention may include a system to execute an algorithm to extract the access control information from the collaboration processes and the attached access control objects. The business object node tree (e.g., software object 105) may be represented in list form. The compositional information may be available via the key and parent key fields. Additionally, nodes from embedded dependent objects may be merged into the list. FIG. 5 illustrates a business object instance that has one collaboration process embedded, e.g., 532. The collaboration process 532 has an access control object 534 associated with it, which defines access for one party and a reference to another node. The table in FIG. 4 may represent the same information as in FIG. 5, and may illustrate one list-form representation of the linked hierarchy. The list could have any number of attributes, and the list of FIG. 4 is shown with only a few illustrative attributes.

Figure 6:
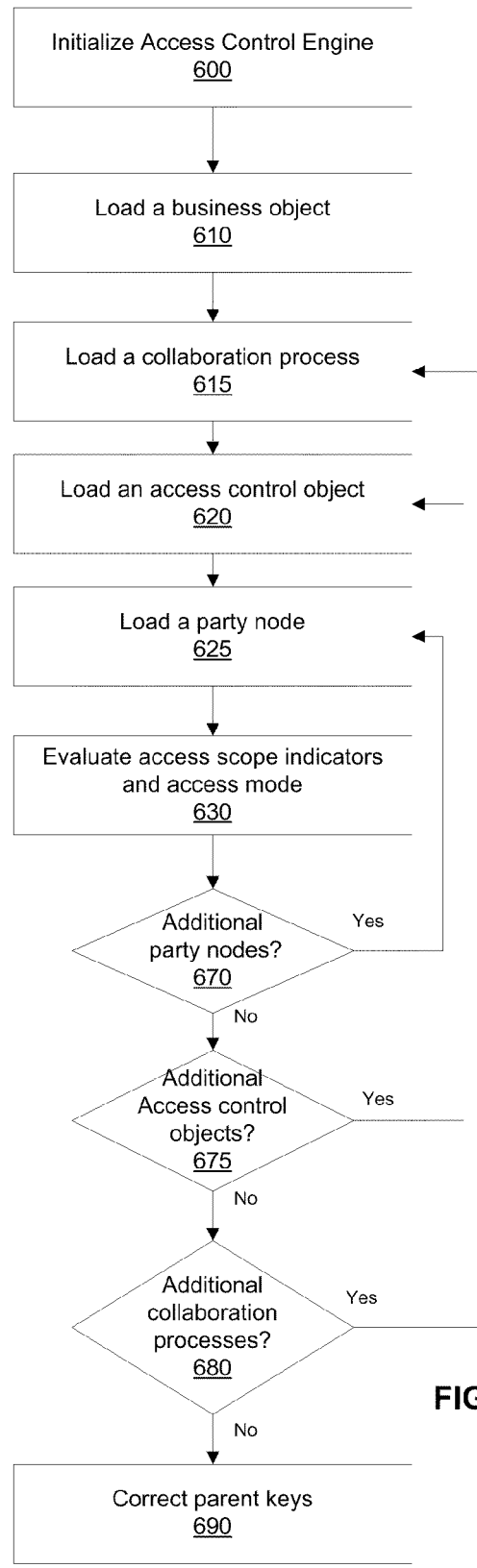
FIG. 6 is a flow chart illustrating an example recursive process according to one aspect of an example embodiment of the present invention.

FIG. 6 illustrates one example embodiment of a recursive building a set of per-party access lists. First, at 600, the access control engine may be initialized. Next, at 610, the example embodiment may load a software object and/or business object, e.g., 105. Next, a recursive process for analyzing each partner/party node, of each access control object, or each collaboration process is illustrated in 620/670, 625/675, and 630/680. Once the first collaboration process is loaded at 620, a first access control object is loaded at 625. Next, the first of any party nodes associated with the access control object is loaded at 630. Then, the access scope indicators and access mode are evaluated for that partner object. This may be the process in which the individual access list for a single party is constructed. The process may be repeated until a list is assembled for each party of each node, and each node of each process object.

Figure 7:
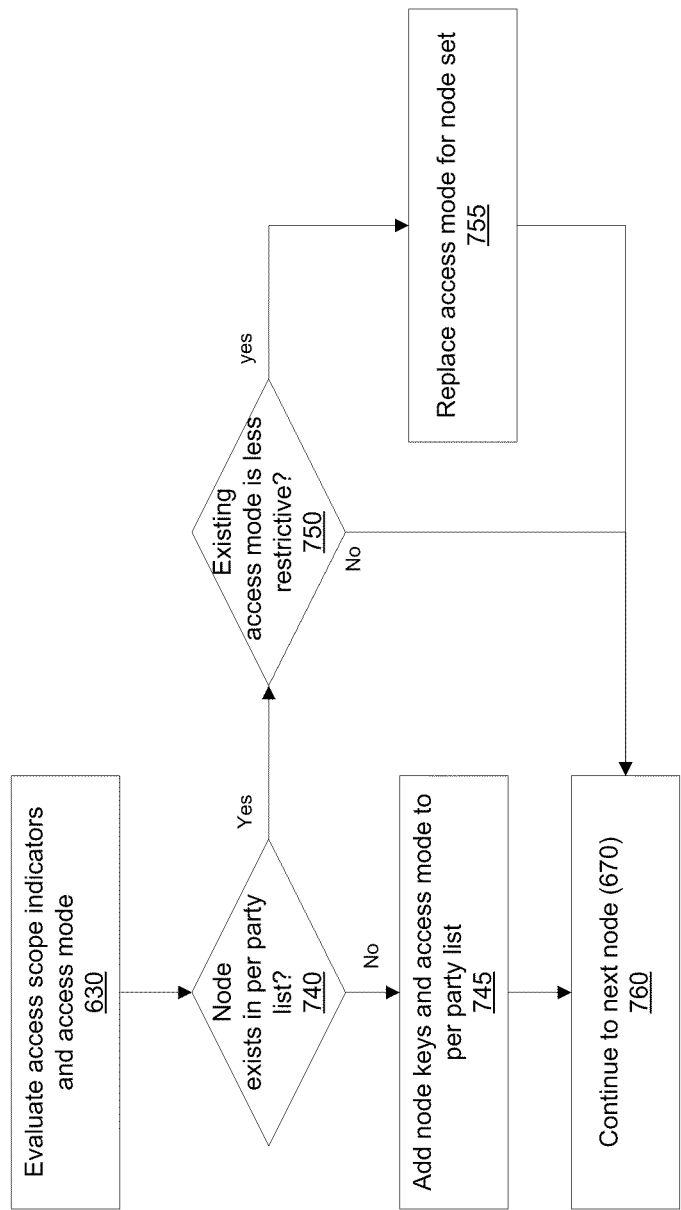
FIG. 7 is a flow chart illustrating another example process according to another aspect of an example embodiment of the present invention.

FIG. 7 illustrates the details of constructing the per-party list. At 630 the access scope indicators (e.g., as illustrated in FIG. 3) are evaluated. For each node set with an indicator, the current party list for this particular party is checked to see if the node key is already listed at 740. If it is not, the new node keys and access mode are added to the access list at 745, and the process may continue to the next node at 760. If the entry already exists, the example process may check to see if the existing entry is less restrictive at 750. If so, the new entry may replace the existing mode for that node set at 755. If it is not less restrictive, the new entry may be ignored in favor of the previous one. The example process may again continue to the next node at 750. This may be done for each node set with a defined indicator (e.g., as illustrated in FIG. 3), before returning to 670 in FIG. 6, to recursively check for additional party nodes at 670, additional access control objects at 675, and additional collaboration processes at 680. Once each per-party access list is constructed, the example process may correct any parent key entries at 690. Since each party may have a link hierarchy different than the unrestricted source data, any omitted nodes may have to have parent links corrected to account for any access restrictions in the ancestral chain. It may be noted that the example processes of FIGS. 6 and 7 are only one illustrative example. Other specific process steps and structures may result in a more optimized algorithm to conserve memory and processing resources while executing the example processes.

FIG. 8 illustrates a generic structure of a resulting per-party access list (e.g., based on the linked hierarchy illustrated in FIG. 5). This list may be used to evaluate the access to a given business object node and render the according restricted view of the Business Object hierarchy. Here, a specific example is illustrated for a partner with ID "1" and read access to two nodes, e.g., K05 and K06. As illustrated in FIG. 4, K05 may be the unique node ID for node "D" and K06 may be the unique node ID for node "E." As a final result, this party specific access list may allow the GUI generator to know which modules to display (e.g., those associated with software object nodes listed as having at least read access), which messages within modules to display, and which functions within modules to display (e.g., read, write, delete, etc.) according to the listed access level. For example, a GUI may be rendered by analyzing the business object and collaboration object (e.g., by analyzing the recursively constructed list data-structure), displaying those segments where read access is associated and omitting those segments where read access is restricted. Likewise, within each segment, a rendering engine may display sub-sections and data where there is read access and omit those segments where read access is restricted. Function buttons may be included in the display of segments and data, where selecting the function activates some data function stored in the objects, e.g., delete, modify, etc. Likewise, the rendering engine may produce a button for each function with associated access rights, and omit or disable that button when rights to that function are restricted.

FIG. 9 illustrates a system for executing example processes and data structures described above. The example system may include one or more servers 910, interconnected by a network 920. The servers may include several databases and execution modules. For example, a collaboration process engine 940 may be connected to a software object database 930, a collaboration process database 933, and an access control database 937, which may contain the access control objects (e.g., FIG. 3). There may be an access control engine 940 connected to the access control data and collaboration process engine 940, which may be used for constructing the per-party access control lists, e.g., FIGS. 6 and 7. There may be a per-party access control list database 935 to store the resulting data lists. Finally, a GUI rendering engine 960 may receive data from the access list database 935 to construct properly restricted GUIs for a particular requesting user. Any number of other modules or configurations are possible for executing example embodiments of the present invention.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

I claim:

1. A non-transitory machine-readable medium to store data in accordance with an access control object data structure, the access control object data structure comprising:
    a hierarchical business object including a plurality of nodes representing a collaboration project, the plurality of nodes include a current object node, a parent node of the current object node, ancestor nodes of the current object node, descendant nodes of the current object node, and sibling nodes of the current object node;
    a collaboration process node being associated with the current object node, the collaboration process node defining a collaboration activity for users of the collaboration project represented by the hierarchical business object; and
    an access control object including a root access node and a partner node directly linked to the root access node, wherein,
        the root access node is linked to the current object node via the collaboration process node and defines access control for the current object node, the root access node including:
            a key to uniquely identify the root access node;
            a host key to store a unique ID of the current object node;
            a plurality of scope indicators, each scope indicator being applicable to one of a plurality of pre-defined sets of nodes belonging to the hierarchical business object that includes the current object node and each scope indicator indicating a level of access to the pre-defined set of nodes in the hierarchical business object; and
        the partner node includes data defining access of a single user to the nodes of the hierarchical business object, the partner node including:
            a key to uniquely identify the partner node;
            a root key to store a unique ID of the root access node;
            a partner ID to store a unique ID of the single user; and
            an access mode to define a level of access for the single user to one or more of the pre-defined sets of nodes, the access mode being derived from the plurality of scope indicators in the root access node.

2. The non-transitory machine-readable medium of claim 1, wherein the partner node further includes:
    an access administrator mode to define the level of access the user may grant other users.

3. The non-transitory machine-readable medium of claim 1, the access control object data structure further comprising:

a plurality of partner nodes, each node associated with a different user.

4. The non-transitory machine readable medium of claim 1, wherein the plurality of scope indicators includes at least one of the following pre-defined sets of nodes: current node, parent node, all ancestor nodes, all descendant nodes, and all sibling nodes.

5. The non-transitory machine-readable medium of claim 1, the access control object further comprising:
a reference for associating the access control object with a referenced object node belonging to the hierarchical business object including the current object node, the reference including:
a reference key to uniquely identify the reference;
a reference parent key to store a unique ID of the root access node; and
a target key to store a unique ID of the referenced object.

6. The non-transitory machine-readable medium of claim 1, wherein the access mode in the partner node is derived based on the user's level of involvement in the collaboration project.

7. The non-transitory machine-readable medium of claim 1, the access control structure further comprising:
a generic function configured to inherit process-specific functionality from the current object node.

8. The non-transitory machine-readable medium of claim 1, wherein the partner node further includes at least one of a time the level of access was granted, an ID of another user granting the level of access, and a validity period for the level of access.

9. The non-transitory machine-readable medium of claim 1, wherein the access modes include:
read only mode;
read and update mode;
create, read and update mode; and
create, read, update and delete mode.

10. The non-transitory machine-readable medium of claim 1, wherein the access administrator modes include:
no changes allowed;
can grant read access to other parties;
can grant lower level of access to other parties;
can grant same level of access to other parties; and
can grant and revoke any access.

11. The non-transitory machine-readable medium of claim 1, wherein the scope indicators in the root node are determined based on a collaboration process object node associated with the other object node.

12. The non-transitory machine-readable medium of claim 1, wherein the level of access for the user to the pre-defined set of nodes is based on a collaboration process object node associated with the other object node.

13. The non-transitory machine-readable medium of claim 1, wherein the partner node further comprises an access administrator mode to define types of changes the user is allowed to make in the access control object data.

14. A non-transitory machine-readable medium having stored thereon instructions to be executed by a processor, the instructions which, when executed, cause the processor to perform a method of constructing a per-party access control item, comprising:
loading on an access control computer system an access control object associated with a collaboration process node from a collaboration process object node mapped to a current object node which is part of a linked hierarchy business object including a plurality of nodes representing a collaboration project, the access control object including a root access node and a plurality of partner nodes linked to the root access node, wherein, the root access node includes:
a key to uniquely identify the root access node;
a host key to store a unique ID of the current object node;
a plurality of scope indicators, each scope indicator being applicable to one of a plurality of pre-defined sets of nodes belonging to the hierarchical business object that includes the current object node and each scope indicator indicating a level of access to the pre-defined set of nodes in the hierarchical business object;
for each partner node representing access of a single user and associated with the access control object, constructing an access control item including the ID of accessible nodes, and an access level indication for the user to each of the accessible nodes, the access level being based on the plurality of scope indicators in the root access node, wherein,
the partner node includes data defining access of a single user to the nodes of the hierarchical business object, the partner node including:
a key to uniquely identify the partner node;
a root key to store a unique ID of the root access node;
a partner ID to store a unique ID of the single user; and
an access mode to define a level of access for the single user to one or more of the ore-defined sets of nodes, the access mode being derived from the plurality of scope indicators in the root access node; and
rendering a user interface for each user based on the respective partner node, wherein the user interface is rendered to include only data and functions accessible to the user according to the access control item in the respective partner node.

15. The non-transitory machine readable medium of claim 14, wherein the current object node is a member of the plurality of nodes in the linked hierarchy business object, and wherein access to any node by a particular user is determined by the per-party access control item.

16. The non-transitory machine readable medium of claim 14, wherein the access control item further includes at least one of a time the access level was granted, an ID of another user granting the level of access, and a validity period for the access level.

17. A method of constructing an access control object, comprising:
associating an access control object instance with a collaboration process node from a collaboration process object mapped to a current object node, the access control object instance including a root access node and a plurality of partner nodes, the plurality of partner nodes directly linked to the root access node, and the current object node being part of a linked hierarchy of a plurality of nodes representing a collaboration project,
wherein, the root access node is linked to the current object node via the collaboration process node and defines access control for the current object node, the root access node including:
a key to uniquely identify the root access node; and
a host key to store a unique ID of the current object node;
storing in the root access node a scope indicator for each node in the linked hierarchy of nodes that includes the current object node, each scope indicator indicating a level of access to one of a plurality of pre-defined sets of nodes in the linked hierarchy of nodes that is based on the collaboration process object;

storing, in each partner node of the plurality of partner nodes, data representing access of a single user to the nodes in the linked hierarchy of nodes including:

a key to uniquely identify the partner node;

a root key to store a unique ID of the root access node;

a partner ID to store a unique ID of the single user; and an ID for each accessible node in the linked hierarchy for the user associated with the partner node, an access level indication for the single user to each of the accessible nodes determined based on the scope indicators and the collaboration process object, and an access administration mode indicator indicating types of changes the single user is allowed to make in the partner node.

18. The method of claim 17, wherein the storing, in each partner node is performed for each partner node having access to the collaboration node.

19. The method of claim 17, further comprising:

instantiating functionality inherited from the collaboration process object for a generic function defined in the access control object.

20. The method of claims 17, wherein storing includes storing at least one of a time the access level was granted, an ID of another user granting the level of access, and a validity period for the access level.

21. A system for constructing an access control object, comprising:

a processor having stored thereon instructions, the instructions, which when executed, cause the processor to:

associate an access control object instance with a collaboration process node mapped to a current object node, the access control object instance including a root access node and a plurality of partner nodes, the plurality of partner nodes directly linked to the root access node, and the current object node being part of a linked hierarchy of a plurality of nodes representing a collaboration project, wherein, the root access node is linked to the current object node via the collaboration process node and defines access control for the current object node, the root access node including:

a key to uniquely identify the root access node; and a host key to store a unique ID of the current object node;

store in the root access node a scope indicator for each node in the linked hierarchy of nodes that includes the current object node, each scope indicator indicating a level of access to one of a plurality of pre-defined sets of nodes in the linked hierarchy of nodes that is based on the collaboration process object;

storing, in each partner node of the plurality of partner nodes, data representing access of a single user to the nodes in the linked hierarchy of nodes including:

a key to uniquely identify the partner node;

a root key to store a unique ID of the root access node;

a partner ID to store a unique ID of the single user; and an ID for each accessible node in the linked hierarchy for the user associated with the partner node, an access level indication for the single user to each of the accessible nodes determined based on the scope indicators and the collaboration process object, and an access administration mode indicator indicating types of changes the user is allowed to make in the partner node.

22. The system of claim 21, wherein the instructions, when executed, cause the processor to:

receive a request for data from a node of the linked hierarchy of nodes that includes a partner ID, and provide the data based on access rights determined by a combination of the scope indicators and the access level indication stored in the partner node.

23. The system of claim 22, wherein the instructions, when executed, cause the processor to construct a graphical user interface based on the linked hierarchy of nodes, and wherein provide the data includes limiting the graphical user interface to only data with associated granted access rights to a particular requesting user.

24. The system of claim 21, wherein the access control object includes a generic method definition, and wherein the process is configured to instantiate functionality inherited from the collaboration node in the generic method definition.

25. The system of claim 21, wherein the access control object further includes at least one of a time the access rights were granted, an ID of another user granting the level of access, and a validity period for the access rights.

* * * * *